(12) United States Patent
Shen et al.

(10) Patent No.: US 11,379,819 B2
(45) Date of Patent: Jul. 5, 2022

(54) METHOD AND APPARATUS FOR INFORMATION EXCHANGE

(71) Applicant: Advanced New Technologies Co., Ltd., Grand Cayman (KY)

(72) Inventors: Lingnan Shen, Hangzhou (CN); Ge Chen, Hangzhou (CN); Yanghui Liu, Hangzhou (CN); Huifeng Jin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/405,563

(22) Filed: May 7, 2019

(65) Prior Publication Data

US 2019/0266592 A1    Aug. 29, 2019

Related U.S. Application Data

(63) Continuation of application No. PCT/CN2017/113322, filed on Nov. 28, 2017.

(30) Foreign Application Priority Data

Dec. 5, 2016  (CN) .......................... 201611102077.5

(51) Int. Cl.
  *G06Q 20/32*  (2012.01)
  *G06K 17/00*  (2006.01)
  *G06Q 20/40*  (2012.01)

(52) U.S. Cl.
  CPC ..... *G06Q 20/3274* (2013.01); *G06K 17/0025* (2013.01); *G06Q 20/3276* (2013.01); *G06Q 20/4014* (2013.01)

(58) Field of Classification Search
  CPC .......... G06Q 20/3274; G06Q 20/3276; G06Q 20/4014; G06K 17/0025

(Continued)

(56) References Cited

U.S. PATENT DOCUMENTS 6,332,133 B1 * 12/2001 Takayama .......... G06Q 20/0425
                                                                705/17
10,318,934 B2 *  6/2019 Stewart ................ G06Q 20/085
(Continued)

FOREIGN PATENT DOCUMENTS

CN       101187974        5/2008
CN       102081769        6/2011
(Continued)

OTHER PUBLICATIONS

A. Majumder, et al.,"Pay-Cloak: A Biometric Back Cover for Smartphones: Facilitating secure contactless payments and identity virtualization at low cost to end users.," 2017, IEEE Consumer Electronics Magazine, vol. 6, No. 2, pp. 78-88, (Year: 2017).*

(Continued)

*Primary Examiner* — Hani M Kazimi
*Assistant Examiner* — Alison L. Lamb
(74) *Attorney, Agent, or Firm* — Fish & Richardson P.C.

(57) ABSTRACT

This specification techniques for sharing service and identity information between devices. One example method include acquiring, by a first device, a digital object identifier (DOI) of a second device, the DOI including identity information associated with the second device; generating, by the first device, a service DOI based on the identity information from the DOI of the second device, the service DOI including the identity information of the second device and service information; and displaying, by the first device, the service DOI on a display of the first device, wherein the displayed service DOI is configured to cause the second device to perform service processing when the displayed service DOI is acquired by the second device, and wherein the service processing is based at least in part on the identity information and the service information included in the service DOI.

15 Claims, 14 Drawing Sheets

(58) Field of Classification Search
USPC .......................................................... 705/44
See application file for complete search history.

(56) References Cited

U.S. PATENT DOCUMENTS

| | | | |
|---|---|---|---|
| 2013/0110717 A1 | 5/2013 | Kobres | |
| 2013/0240621 A1 | 9/2013 | Everett | |
| 2014/0054367 A1* | 2/2014 | Alexeev | G06Q 20/3274 235/375 |
| 2014/0129428 A1* | 5/2014 | Tyler | G06Q 30/06 705/39 |
| 2015/0059003 A1* | 2/2015 | Bouse | G06F 21/32 726/28 |
| 2015/0088674 A1 | 3/2015 | Fluerscheim et al. | |
| 2016/0042485 A1 | 2/2016 | Kopel | |
| 2016/0104155 A1* | 4/2016 | McGaugh | G06Q 20/325 705/65 |
| 2017/0132636 A1* | 5/2017 | Caldera | G06Q 20/4016 |

FOREIGN PATENT DOCUMENTS

| | | |
|---|---|---|
| CN | 102542350 | 7/2012 |
| CN | 103548046 | 1/2014 |
| CN | 103824203 | 5/2014 |
| CN | 104021468 | 9/2014 |
| CN | 104732388 | 6/2015 |
| CN | 104751334 | 7/2015 |
| CN | 105260886 | 1/2016 |
| CN | 105590199 | 5/2016 |
| CN | 105868981 | 8/2016 |
| CN | 107038569 | 8/2017 |
| JP | 2015514249 | 5/2015 |
| JP | 2016004352 | 1/2016 |
| JP | 2016053967 | 4/2016 |
| KR | 20140140553 | 12/2014 |
| KR | 20150013099 | 2/2015 |
| KR | 20160004776 | 1/2016 |
| TW | M410932 | 9/2011 |
| TW | 201401211 | 1/2014 |
| TW | M509938 | 10/2015 |
| WO | WO 2015101310 | 7/2015 |
| WO | WO-2015101310 A1 * | 7/2015 ............ G06Q 20/32 |

OTHER PUBLICATIONS

International Preliminary Report on Patentability in International Application No. PCT/CN2017/113322, dated Jun. 11, 2019, 10 pages.
International Search Report and Written Opinion in International Application. No. PCT/CN2017/113322, dated Mar. 5, 2018, 15 pages (with English translation).
Extended European Search Report in European Application No. 18865359.6, dated Oct. 7, 2019, 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

METHOD AND APPARATUS FOR INFORMATION EXCHANGE

CROSS-REFERENCE TO RELATED APPLICATIONS

This application is a continuation of PCT Application No. PCT/CN2017/113322, filed on Nov. 28, 2017, which claims priority to Chinese Patent Application No. 201611102077.5, filed on Dec. 5, 2016, and each application is hereby incorporated by reference in its entirety.

TECHNICAL FIELD

The present application relates to the field of computer software technologies, and in particular, to a method and an apparatus for information exchange.

BACKGROUND

Currently, with popularization of mobile devices such as smartphones and tablet computers, many online services also need to support mobile scenarios, for example, services in the mobile scenarios such as electronic payment, transfer, withholding, electronic vouchers, and business card exchange.

In offline scenarios, the previous services usually need end-user devices to perform proximity bidirectional communication to implement corresponding services, for example, to perform proximity bidirectional communication to mutually verify identity information.

In the existing technology, proximity bidirectional communication technologies that support offline scenarios mainly include near field communication (NFC), Bluetooth, etc.

In the Bluetooth technology, end-user devices can communicate only after a wireless connection is established, and consequently communication steps are complex. In addition, the end-user devices need to have Bluetooth wireless communications modules.

The NFC technology depends on a near-field radio frequency signal for communication. In a mature technology, communication can be performed in a radio frequency field without manually establishing a connection. However, in the NFC, end-user devices need to have NFC communications modules, and currently, most smartphones do not have NFC communications modules.

Therefore, in the existing technology, proximity bidirectional communication in offline scenarios can be supported only by using special communications module such as Bluetooth wireless communications module or NFC communications modules, and consequently, costs are relatively high.

SUMMARY

Implementations of the present application provide a method and an apparatus for information exchange, so as to alleviate a technical problem in the existing technology that proximity bidirectional communication in offline scenarios can be supported only by using special communications module such as Bluetooth wireless communications module or NFC communications modules, and consequently, costs are relatively high.

To alleviate the previously described technical problem, the implementations of the present application are implemented as follows:

An implementation of the present application provides a method for information exchange, including the following: scanning and identifying, by a first end-user device, a digital object identifier (DOI) of a second end-user device, where the DOI of the second end-user device includes identity information of the second end-user device; and generating and displaying, by the first end-user device, a service DOI based on the identity information of the second end-user device that is identified from the DOI of the second end-user device, so that the second end-user device scans and identifies the service DOI, and performs service processing based on an identification result; where the service DOI includes the identity information of the second end-user device and specified service information.

An implementation of the present application provides a second method for information exchange, including the following: generating, by a second end-user device, a digital object identifier (DOI) of the second end-user device, where the DOI of the second end-user device includes identity information of the second end-user device; scanning and identifying, by the second end-user device, a service DOI displayed by a first end-user device, where the service DOI is generated by the first end-user device based on the identity information of the second end-user device, and the identity information of the second end-user device is obtained by the first end-user device by scanning and identifying the DOI of the second end-user device; and performing, by the second end-user device, service processing based on an identification result of the service DOI; where the service DOI includes the identity information of the second end-user device and specified service information.

An implementation of the present application provides a third method for information exchange, including the following: receiving, by a server, identity information of a second end-user device that is sent by the second end-user device and that is obtained by scanning and identifying a service digital object identifier (DOI), and specified service information; and performing, by the server, verification on the identity information of the second end-user device, and performing service processing based on the specified service information after the verification succeeds; where the service DOI is generated and displayed by a first end-user device based on the identity information of the second end-user device.

An implementation of the present application provides a fourth method for information exchange, including the following: scanning and identifying, by a first end-user device, a digital object identifier (DOI) of a second end-user device by using a front-facing camera; and generating and displaying, by the first end-user device, a DOI of the first end-user device based on information identified from the DOI of the second end-user device, so that the second end-user device scans and identifies the DOI of the first end-user device by using a front-facing camera, and processes an identification result.

An implementation of the present application provides an apparatus for information exchange, where the apparatus is located on a first end-user device, and includes the following: a scanning and identification module, configured to scan and identify a digital object identifier (DOI) of a second end-user device, where the DOI of the second end-user device includes identity information of the second end-user device; and a generation and display module, configured to generate and display a service DOI based on the identity information of the second end-user device that is identified by the scanning and identification module from the DOI of the second end-user device, so that the second end-user device scans and identifies the service DOI, and performs service processing based on an identification result; where the service DOI includes the identity information of the second end-user device and specified service information.

An implementation of the present application provides a second apparatus for information exchange, where the apparatus is located on a second end-user device, and includes the following: a generation module, configured to generate a digital object identifier (DOI) of the second end-user device, where the DOI of the second end-user device includes identity information of the second end-user device; a scanning and identification module, configured to scan and identify a service DOI displayed by a first end-user device, where the service DOI is generated by the first end-user device based on the identity information of the second end-user device, and the identity information of the second end-user device is obtained by the first end-user device by scanning and identifying the DOI of the second end-user device; and a processing module, configured to perform service processing based on an identification result of the service DOI by the scanning and identification module; where the service DOI includes the identity information of the second end-user device and specified service information.

An implementation of the present application provides a third apparatus for information exchange, where the apparatus is located on a server, and includes the following: a receiving module, configured to receive identity information of a second end-user device that is sent by the second end-user device and that is obtained by scanning and identifying a service digital object identifier (DOI), and specified service information; and a service processing module, configured to perform verification on the identity information of the second end-user device, and perform service processing based on the specified service information after the verification succeeds; where the service DOI is generated and displayed by a first end-user device based on the identity information of the second end-user device.

An implementation of the present application provides a fourth apparatus for information exchange, where the apparatus is located on a first end-user device, and includes the following: a front-facing camera scanning and identification module, configured to scan and identify a digital object identifier (DOI) of a second end-user device by using a front-facing camera of the first end-user device; and a generation and display module, configured to generate and display a DOI of the first end-user device based on information identified by the front-facing camera scanning and identification module from the DOI of the second end-user device, so that the second end-user device scans and identifies the DOI of the first end-user device by using a front-facing camera, and processes an identification result.

The previously described at least one solution used in the implementations of the present application can achieve the following beneficial effects: Proximity bidirectional communication in offline scenarios and online scenarios can be implemented without using special communications modules such as Bluetooth wireless communications module or NFC communications modules, which reduces costs. Therefore, some or all problems in the existing technology can be alleviated.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art may still derive other drawings from these accompanying drawings without creative efforts.

DESCRIPTION OF IMPLEMENTATIONS

The implementations of the present application provide a method and an apparatus for information exchange.

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

A core idea of the present application is as follows: End-user devices perform information interaction by bi-directionally scanning and identifying DOIs such as two-dimensional codes, so as to implement near-field bidirectional communication in an offline scenario and an online scenario, and implement a corresponding service. In addition, in the solutions of the present application, the end-user devices can mutually scan and identify the DOIs by using front-facing cameras of the end-user devices. As such, a user can implement two or more scanning and identification processes between two end-user devices by facing one end-user device with the other, implementing a simple operation and relatively high convenience.

For ease of description, two end-user devices that perform information interaction are respectively referred to as a first end-user device and a second end-user device in the present application. In addition, a server can also participate in information interaction. The following separately describes the solutions of the present application from a perspective of the first end-user device, the second end-user device, and the server.

Figure 1:
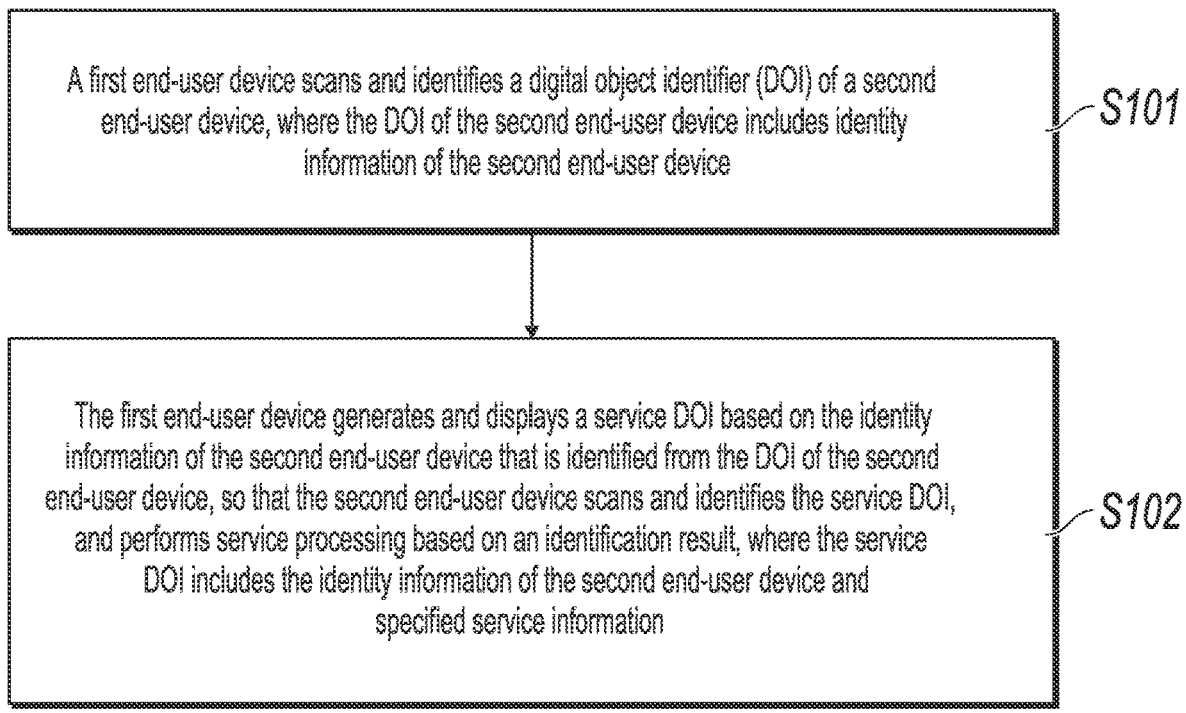
FIG. 1 is a schematic flowchart illustrating a method for information exchange, according to an implementation of the present application.

FIG. 1 is a schematic flowchart illustrating a method for information exchange, according to an implementation of the present application. The procedure mainly corresponds to a first end-user device. From a perspective of a device, an execution body of the procedure can include but is not limited to the following end-user devices: a mobile phone, a tablet computer, a smartwatch, a vehicle, a personal computer, a medium and large-sized computer, a computer cluster, etc. From a perspective of a program, an execution body of the procedure includes but is not limited to a client mounted on the end-user device.

The procedure in FIG. 1 can include the following steps.

S101. A first end-user device scans and identifies a digital object identifier (DOI) of a second end-user device, where the DOI of the second end-user device includes identity information of the second end-user device.

In this implementation of the present application, the DOI includes but is not limited to a two-dimensional code, a barcode, a character code, a network domain name, etc.

In this implementation of the present application, both the first end-user device and the second end-user device each have or are connected to a module that can scan a DOI, for example, a camera or a scanner. By using a mobile phone as an example, a front-facing camera or a rear-facing camera of the mobile phone can be used as a scanning module. In the solution of the present application, the front-facing camera is a preferred scanning module, and reasons are specifically analyzed later.

In this implementation of the present application, the second end-user device can generate the DOI of the second end-user device in advance and then display the generated DOI, or output the DOI and then display the DOI by using another medium (for example, output the DOI to a printer and then print the DOI on a paper for display). The following implementation is mainly described for the former case.

Further, the identity information includes device information and/or account information. For example, assume that the procedure in FIG. 1 is executed by a certain client on the first end-user device, the identity information of the second end-user device can be a device identification code of the second end-user device, a login user account on a client on the second end-user device corresponding to the client, etc.

S102. The first end-user device generates and displays a service DOI based on the identity information of the second end-user device that is identified from the DOI of the second end-user device, so that the second end-user device scans and identifies the service DOI, and performs service processing based on an identification result, where the service DOI includes the identity information of the second end-user device and specified service information.

In this implementation of the present application, in addition to the identity information, the DOI of the second end-user device can also include any other information that needs to be transmitted by the second end-user device to the first end-user device, for example, a web page link or a multimedia file. In this case, the first end-user device can also generate and display the service DOI based on any information included in the DOI of the second end-user device.

In this implementation of the present application, after identifying the identity information of the second end-user device, the first end-user device can perform verification on the identity information of the second end-user device, to determine whether the second end-user device is a legal object for a subsequent service. This is because an illegal object can possibly pretend to be a certain legal object to deceive a user of the first end-user device into services in practice.

The verification can be performed by a device or a program (for example, a server) other than the first end-user device and the second end-user device. In this case, the first end-user device can directly or indirectly provide the identified identity information of the second end-user device to the device or the program for use.

In this implementation of the present application, the identity information of the second end-user device that is included in the service DOI can be used by the device or the program for verification, or can be used by the second end-user device to confirm that the first end-user device interacts with the second end-user device by using a specified method (by scanning the DOI of the second end-user device), and is not a harasser that does not use the specified method.

In practice, information interaction between the first end-user device and the second end-user device usually aims to perform a certain service such as electronic payment or friend authentication. The service information included in the service DOI can be detailed content and related parameters of a service to be performed between the first end-user device and the second end-user device.

By using an electronic payment service as an example, a user of the first end-user device can be a payer (for example, a buyer), a user of the second end-user device can be a payee (for example, a seller), and service information included in the service DOI can be a payment amount, a payment account, a withholding voucher, etc.

By using friend authentication as an example, a user of the first end-user device can be a user who actively requests to perform friend authentication, a user of the second end-user device can be a user who the user of the first end-user device wants to making a friend with through friend authentication, and the service information included in the service DOI can be a social network account of the user of the first end-user device, etc.

In this implementation of the present application, the second end-user device can perform service processing based on an identification result of the DOI (mostly in an offline scenario). The second end-user device can perform service processing by cooperating with another device or program (for example, the server or even the first end-user device) based on an identification result of the DOI. In this case, not all actions of service processing are performed by the second end-user device.

The procedure in FIG. 1 relates to two scanning and identification operations respectively performed by the first end-user device and the second end-user device on respectively generated DOIs. In practice, more DOI scanning and identification operations can be performed between the first end-user device and the second end-user device, to implement information interaction, and a DOI identified from each scanning and identification operation can be generated based on a previous interaction result.

According to the method in FIG. 1, proximity bidirectional communication in offline scenarios and online scenarios can be implemented without using special communications modules such as Bluetooth wireless communications module or NFC communications modules, which reduces costs. Therefore, some or all problems in the existing technology can be alleviated.

Based on the method in FIG. 1, this implementation of the present application further provides some specific implementation solutions and extension solutions of the method, which are described below.

In this implementation of the present application, that a first end-user device scans and identifies a DOI of a second end-user device in step S101 can specifically include the following: The first end-user device scans and identifies, by using a front-facing camera of the first end-user device, the DOI of the second end-user device that is displayed by the second end-user device. Currently, for a mobile device such as a mobile phone or a tablet computer that is carried by a user, a front-facing camera has become a universal end-user device module. In the solution in the present application, the module can be used, and no new hardware module needs to be added, which is conducive to reducing implementation costs of the solution in the present application.

As mentioned above, in addition to the front-facing camera, modules such as a rear-facing camera of the end-user device and a scanner connected to the end-user device can also be used to scan the DOI. Considering user experience, scanning the DOI by using the front-facing camera is a preferred solution, and the user can implement "one action and a plurality of interactive scanning", implementing simple operations and convenient use. For ease of understanding, description is given with reference to FIG. 2a, FIG. 2b, and FIG. 2C.

Figure 2A:
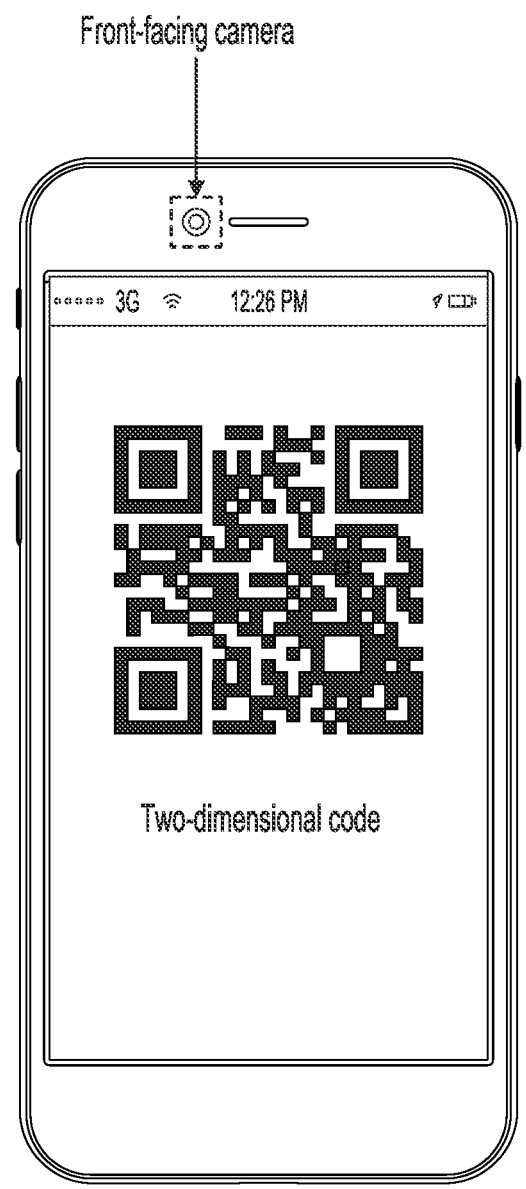
FIG. 2a is a schematic diagram of a front-facing camera of a mobile phone and a two-dimensional code, according to an implementation of the present application.

FIG. 2a is a schematic diagram of a front-facing camera of a mobile phone and a two-dimensional code, according to an implementation of the present application. The front-facing camera in FIG. 2a has become a basic component of most mobile phones and tablet computers, which is conducive to reducing implementation costs of the solution of the present application.

Figure 2B:
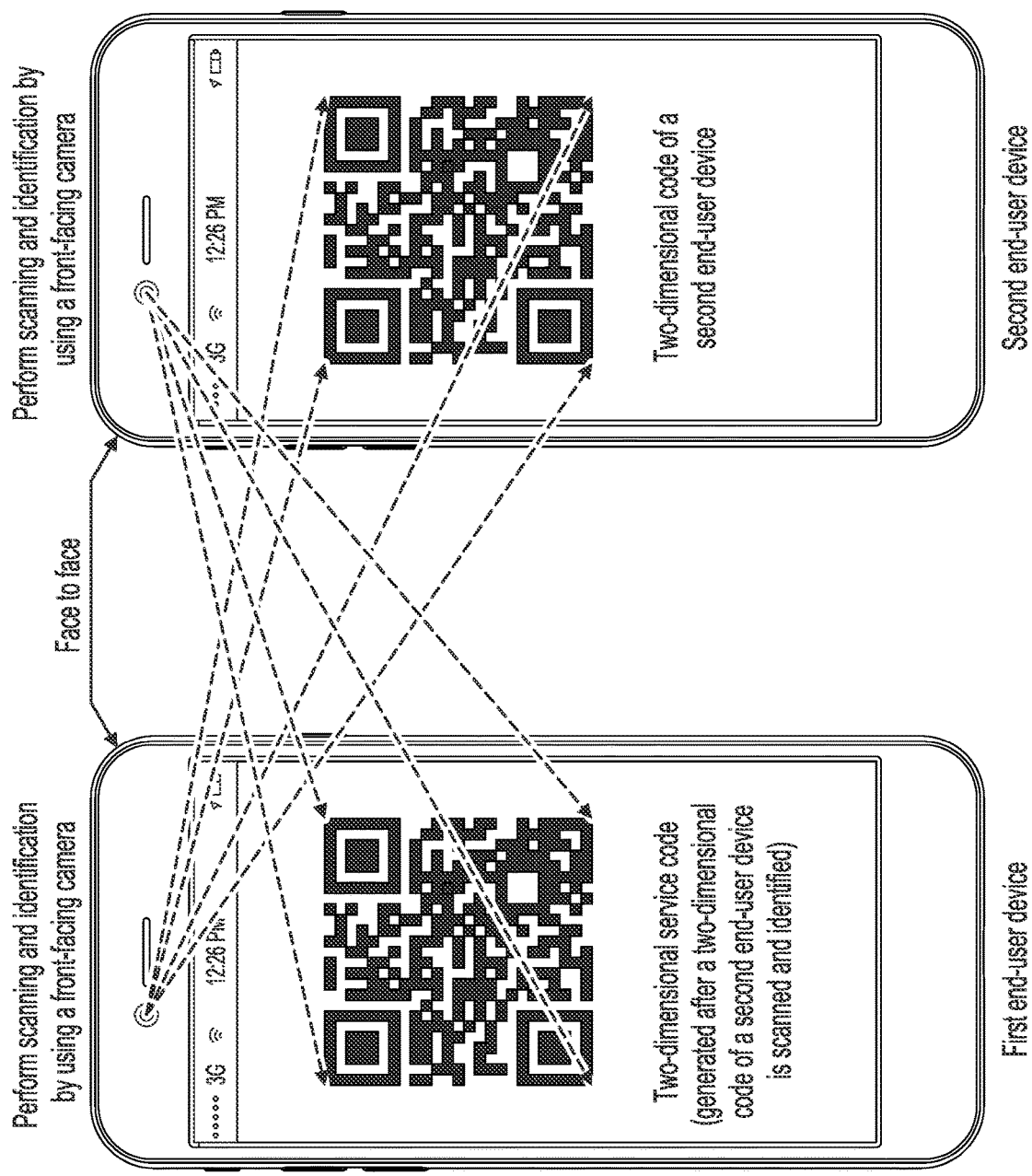
FIG. 2b is a schematic diagram of interactive scanning between end-user devices, according to an implementation of the present application.

FIG. 2b is a schematic diagram of interactive scanning between end-user devices, according to an implementation of the present application. Both the first end-user device and the second end-user device in FIG. 2a are mobile phones. A user of the first end-user device can complete interactive two-dimensional code scanning by frontally facing the first end-user device with the second end-user device.

Figure 2C:
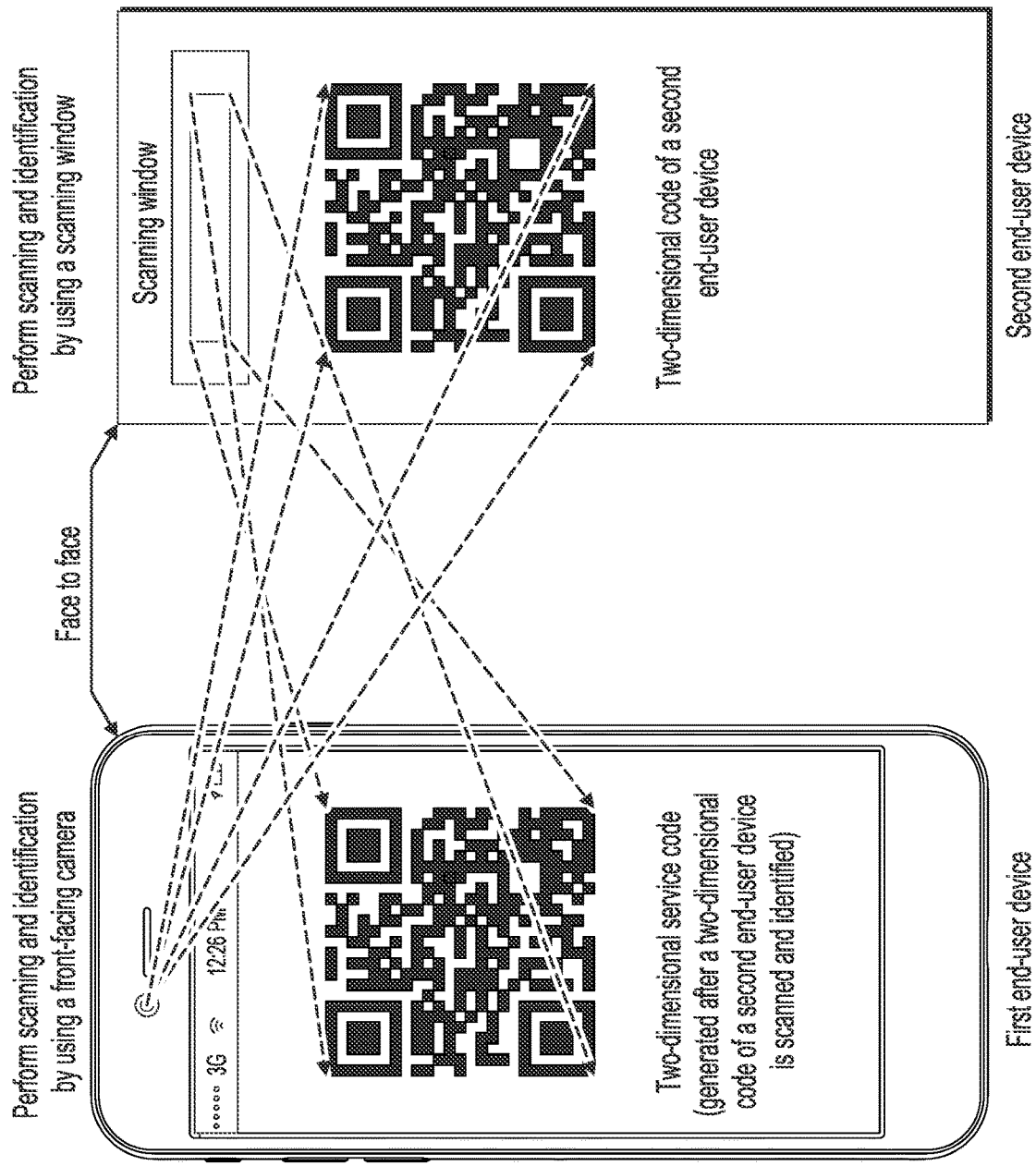
FIG. 2c is another schematic diagram of interactive scanning between end-user devices, according to an implementation of the present application.

FIG. 2c is another schematic diagram of interactive scanning between end-user devices, according to an implementation of the present application. In FIG. 2c, the first end-user device is a mobile phone, the second end-user device is a merchant's cashier code scanning device, and the code scanning device performs code scanning by using a frontal scanning window. A user of the first end-user device can complete interactive two-dimensional code scanning by facing the first end-user device with the second end-user device.

In this implementation of the present application, before the service DOI is generated and displayed in step S102, the following step can also be performed: The first end-user device performs verification on the identity information of the second end-user device that is identified from the DOI of the second end-user device, and determines that the verification succeeds. The subsequent procedure cannot be performed if the verification fails.

Further, the second end-user device can perform verification on identity information of the first end-user device. As such, mutual identity verification between the first end-user device and the second end-user device can be implemented, which is conducive to improving service security. In this case, the service DOI can further include the identity information of the first end-user device, and the second end-user device can obtain the identity information of the first end-user device by scanning and identifying the service DOI for verification.

A specific verification method of the identity information is not limited in the present application. The verification can be performed by automatically performing predetermined verification logic of the end-user device, or the verification can be manually performed by directly displaying identity information that is to be verified, or the like.

The procedure in FIG. 1 is a procedure from a perspective of the first end-user device. An implementation of the present application further provides a schematic flowchart of a second method for information exchange (from a perspective of the second end-user device), which is shown in FIG. 3.

Figure 3:
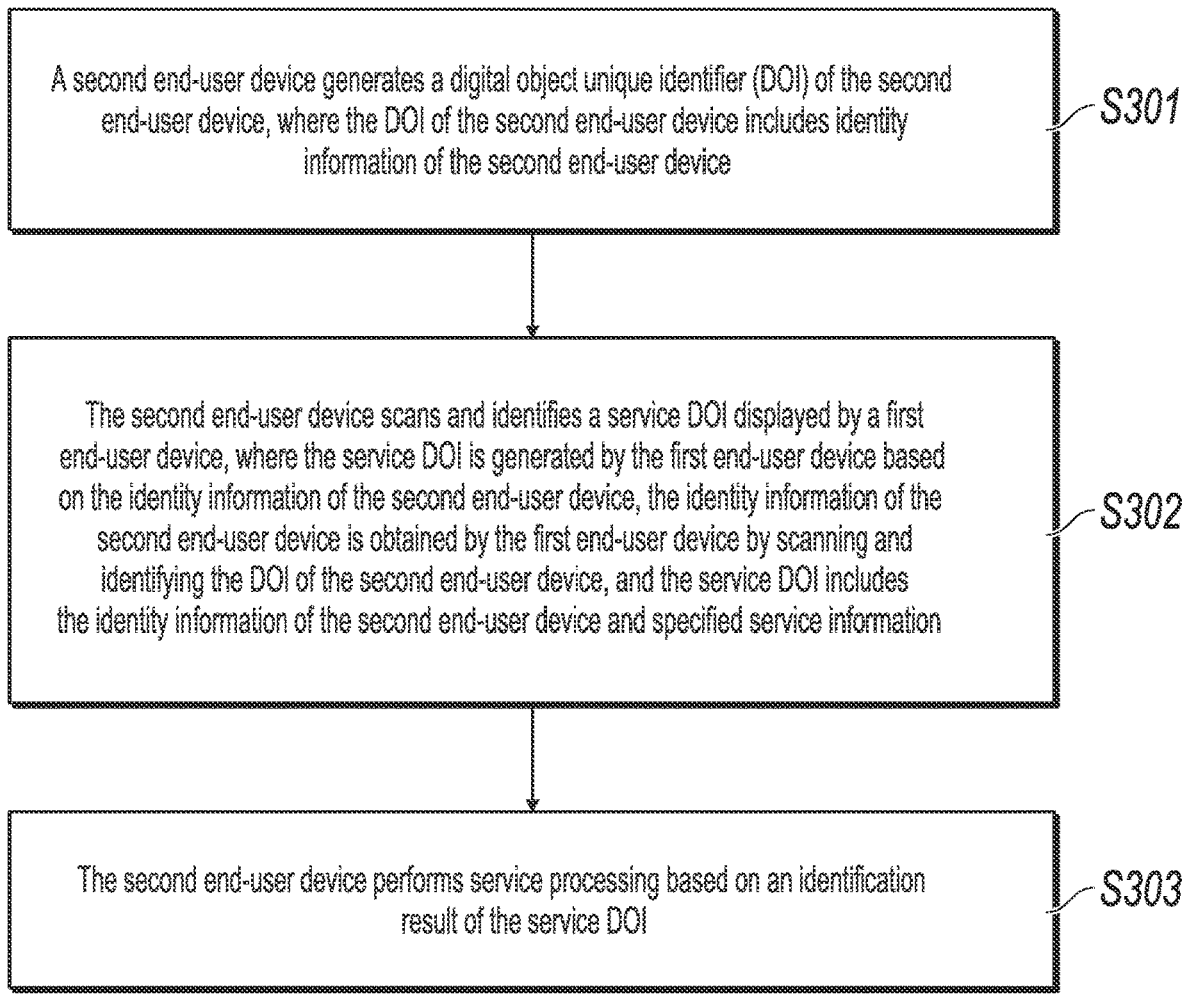
FIG. 3 is a schematic flowchart illustrating a second method for information exchange, according to an implementation of the present application.

The procedure in FIG. 3 mainly corresponds to the second end-user device, and corresponds to the procedure in FIG. 1. From a perspective of a device, an execution body of the procedure in FIG. 3 can include but is not limited to the following end-user devices: a mobile phone, a tablet computer, a smartwatch, a vehicle, a personal computer, a medium and large-sized computer, a computer cluster, etc. From a perspective of a program, an execution body of the procedure in FIG. 3 includes but is not limited to a client mounted on the end-user device.

The procedure in FIG. 3 can include the following steps.

S301. A second end-user device generates a digital object identifier (DOI) of the second end-user device, where the DOI of the second end-user device includes identity information of the second end-user device.

S302. The second end-user device scans and identifies a service DOI displayed by a first end-user device, where the service DOI is generated by the first end-user device based on the identity information of the second end-user device, the identity information of the second end-user device is obtained by the first end-user device by scanning and identifying the DOI of the second end-user device, and the service DOI includes the identity information of the second end-user device and specified service information.

S303. The second end-user device performs service processing based on an identification result of the service DOI.

According to the method in FIG. 3, proximity bidirectional communication in offline scenarios and online scenarios can be implemented without using special communications modules such as Bluetooth wireless communications module or NFC communications modules, which reduces costs. Therefore, some or all problems in the existing technology can be alleviated.

Based on the method in FIG. 3, this implementation of the present application further provides some specific implementation solutions and extension solutions of the method. Some actions of the second end-user device are also described in detail when the procedure in FIG. 1 is described. Therefore, the following mainly gives supplementary description, and repeated content is only briefly described or not described.

In this implementation of the present application, the identity information of the second end-user device can be obtained by the first end-user device by scanning and identifying the DOI of the second end-user device by using a front-facing camera of the first end-user device, where the identity information of the second end-user device is displayed by the second end-user device. Likewise, that a scanning and identification module scans and identifies a service DOI displayed by a first end-user device in step S302 can specifically include the following: The scanning and identification module scans and identifies, by using a front-facing camera of the second end-user device, the service DOI displayed by the first end-user device.

Figure 4:
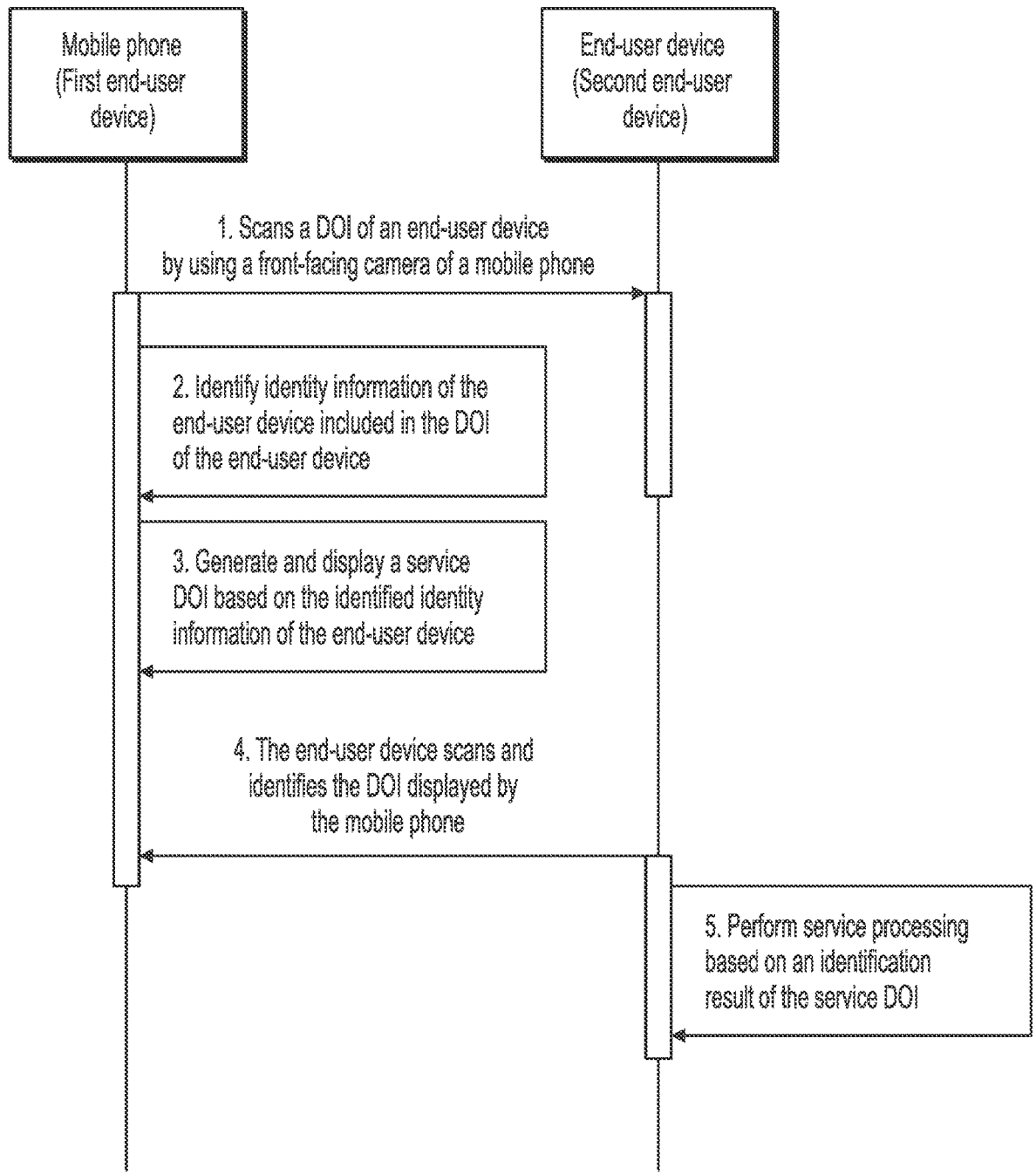
FIG. 4 is a schematic diagram of information interaction between a mobile phone and a certain end-user device in an actual application scenario, according to an implementation of the present application.

According to the procedures in FIG. 1 and FIG. 3, an implementation of the present application further provides a schematic diagram of interaction between a mobile phone and a certain end-user device in an actual application scenario, which is shown in FIG. 4.

In FIG. 4, the "mobile phone" is equivalent to the previously described first end-user device, and the "end-user device" is equivalent to the previously described second end-user device. The end-user device can pre-generate and display a DOI of the end-user device. The mobile phone scans and identifies identity information of the end-user device that is included in the DOI of the end-user device by using a front-facing camera, and then the mobile phone generates and displays a service DOI based on the identified identity information of the end-user device. The end-user device scans and identifies the service DOI, and performs service processing based on an identification result.

In this implementation of the present application, a specific implementation method of step S303 can vary with a service to be performed subsequently. In an electronic payment service scenario, a security problem of an electronic payment service can be effectively alleviated by using a specific implementation method of step S303 provided in this implementation of the present application, which is specifically described below.

In an electronic payment service in the existing technology, payment can be performed by using a two-dimensional code. Specifically, a user can generate and display a two-dimensional code for payment on a mobile phone based on a payment account (namely, identity information) of the user. A merchant can scan and identify the two-dimensional code for payment by using an end-user device, and request a server to deduct money from the payment account of the user.

However, in practice, a malicious fraudster possibly cheats a user out of a two-dimensional code for payment, and the malicious fraudster can deduct money from a payment account of the user by using any end-user device to scan and identify the two-dimensional code for payment, causing a property loss of the user. The essential reason for this problem is that currently, a two-dimensional code on a user end-user device such as the two-dimensional code for payment can be scanned only by other end-user devices. It means that only unidirectional communication is performed, and the user end-user device cannot take precautions against other end-user devices.

According to the solution of the present application, the problem can be alleviated based on the previously described proximity bidirectional communication and at least one specific implementation solution of step S303, which is described below.

That the second end-user device performs service processing based on an identification result in step S303 can specifically include the following: The second end-user device sends the identity information of the second end-user device that is identified from the service DOI, and the specified service information to a server, so that after the identity information of the second end-user device is verified, the server performs service processing based on the specified service information.

It is worthwhile to note that, that the server performs verification on the identity information of the second end-user device can specifically include the following: Whether the identity information of the second end-user device is consistent with identity information of an end-user device that sends the identity information of the second end-user device (in practice, the end-user device can be the second end-user device, or can be an end-user device other than the second end-user device, which is possibly a fraudster).

After completing service processing, the server can return a service processing result to the first end-user device and/or the second end-user device.

In an electronic payment service scenario, the service DOI can be used for payment instead of the two-dimensional code for payment in the existing technology. When the solution in the previous paragraph is used in the electronic payment service scenario, the service information is payment information. That the second end-user device performs service processing based on an identification result in step S303 can specifically include the following: The second end-user device sends the identity information of the second end-user device that is identified from the service DOI, and the specified payment information to the server, so that after the identity information of the second end-user device is verified, the server performs electronic payment service processing based on the specified payment information.

The first end-user device can correspond to a payer of the electronic payment service, and the second end-user device can correspond to a payee of the electronic payment service.

It can be seen that the two-dimensional code for payment in the exiting technology includes only related information of a payer, and does not include any information of a payee. Therefore, precautions cannot be taken against the payee. In the solution of the present application, the service DOI generated based on the proximity bidirectional communication processes in steps S301 and S302 includes the identity information of the second end-user device (which is identity information of the payee, or can reflect at least identity information of the payee). The server can specifically check whether the identity information of the end-user device that sends the information included in the service DOI is consistent with the identity information of the second end-user device that is included in the service DOI.

If yes, the verification succeeds, and the server can determine that the user of the end-user device is a correct payee confirmed by a payer instead of a faker. Therefore, the server can perform corresponding electronic payment service processing.

If no, the verification fails, and the server can determine that an illegal user steals a service DOI generated by a payer for a payee, and pretends to be the payee to interact with the server. Therefore, the server can refuse to process a corresponding electronic payment service.

According to the previously described specific implementation solution in step S303, although the service DOI is stolen by the malicious fraudster, because the service DOI is hardly verified by the server, the malicious fraudster hardly causes a user property loss. Therefore, some or all of the previously described problems of the electronic payment service can be alleviated.

Figure 5:
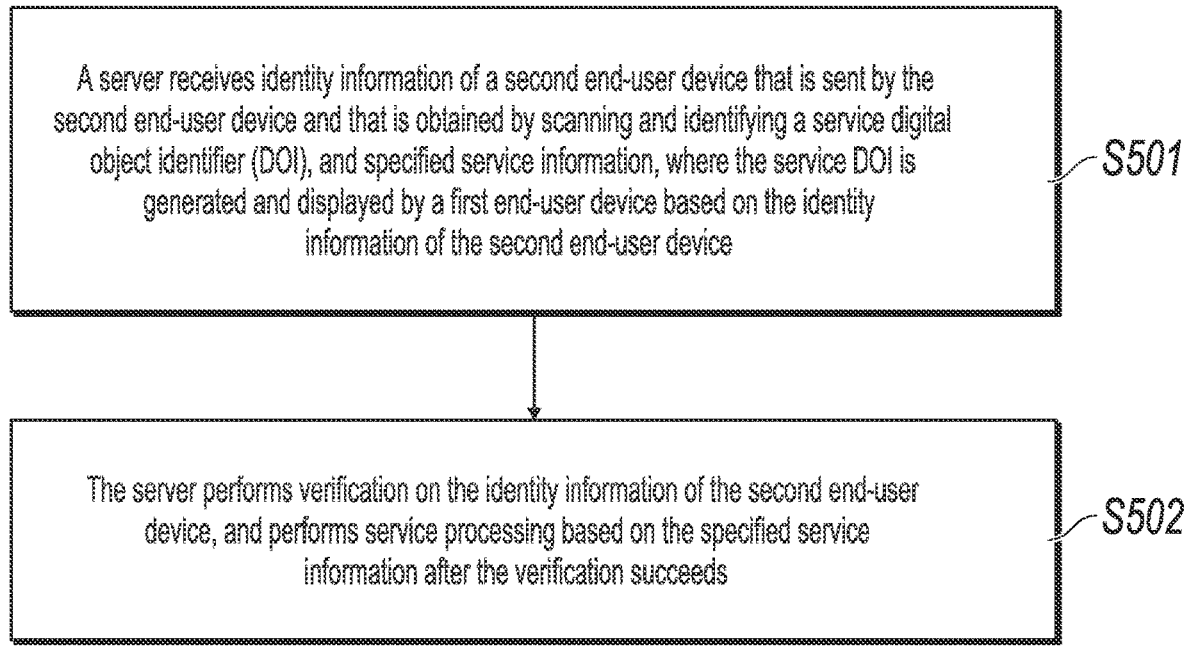
FIG. 5 is a schematic flowchart illustrating a third method for information exchange, according to an implementation of the present application.

When the server participates in information interaction, an implementation of the present application also provides a schematic flowchart illustrating a third method for information exchange (from a perspective of a server), which is shown in FIG. 5.

The procedure in FIG. 5 mainly corresponds to the server, and corresponds to the procedures in FIG. 1 and FIG. 3. From a perspective of a device, an execution body of the procedure in FIG. 5 can include but is not limited to the following end-user devices: a mobile phone, a tablet computer, a smartwatch, a vehicle, a personal computer, a medium and large-sized computer, a computer cluster, etc. From a perspective of a program, an execution body of the procedure in FIG. 5 includes but is not limited to a server mounted on the end-user device.

The procedure in FIG. 5 can include the following steps.

S501. A server receives identity information of a second end-user device that is sent by the second end-user device and that is obtained by scanning and identifying a service digital object identifier (DOI), and specified service information, where the service DOI is generated and displayed by a first end-user device based on the identity information of the second end-user device.

S502. The server performs verification on the identity information of the second end-user device, and performs service processing based on the specified service information after the verification succeeds.

Some or all of the previously described security problems in the electronic payment service scenario can be alleviated by using the method in FIG. 5.

In this implementation of the present application, the identity information of the second end-user device based on which the first end-user device generates and displays the service DOI is obtained by using the following method: The first end-user device scans and identifies, by using a front-facing camera of the first end-user device, a DOI of the second end-user device that is displayed by the second end-user device, to obtain the identity information of the second end-user device that is included in the DOI of the second end-user device.

In this implementation of the present application, the service information can be payment information. That the server performs service processing based on the specified service information in step S502 can specifically include the following: performing electronic payment service processing based on the specified payment information.

Further, the first end-user device can correspond to a payer of the electronic payment service, and the second end-user device can correspond to a payer of the electronic payment service.

In this implementation of the present application, the identity information can include device information and/or account information, etc.

In this implementation of the present application, the DOI can include a two-dimensional code and/or a barcode, etc.

Figure 6:
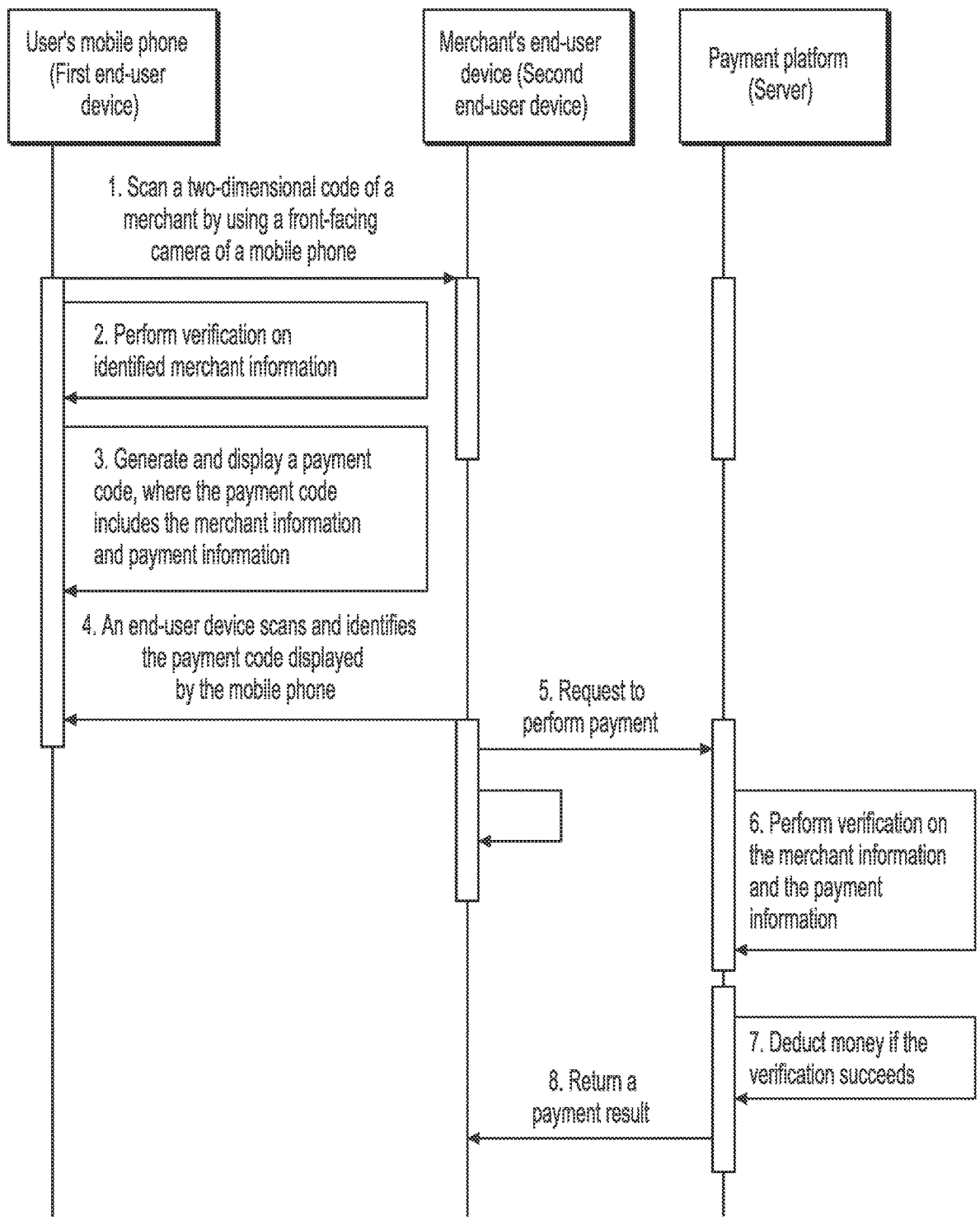
FIG. 6 is a schematic diagram of information interaction between a user's mobile phone, a merchant's end-user device, and a payment platform in an electronic payment service scenario, according to an implementation of the present application.

More intuitively, an implementation of the present application further provides a schematic diagram of information interaction between a user's mobile phone, a merchant's end-user device, and a payment platform in an electronic payment service scenario, which is shown in FIG. 6.

In FIG. 6, the "user's mobile phone" is equivalent to the previously described first end-user device, the "merchant's end-user device" is equivalent to the previously described second end-user device, and the "payment platform" is equivalent to the previously described server. The merchant's end-user device can pre-generate and display a two-dimensional code that includes merchant information. The user's mobile phone scans and identifies the merchant information included in the two-dimensional code by using a front-facing camera, and performs verification. The user's mobile phone generates and displays a payment code (or a two-dimensional code) that includes the merchant information and payment information based on the identified merchant information. The merchant's end-user device scans and identifies the payment code, and initiates a payment request that carries the information identified from the payment code to the payment platform. The payment platform performs verification on the merchant information and the payment information, and after the verification succeeds, the payment platform performs a corresponding deduction operation, and returns a payment result to the merchant's end-user device (or returns a payment result to the user's mobile phone).

Figure 7:
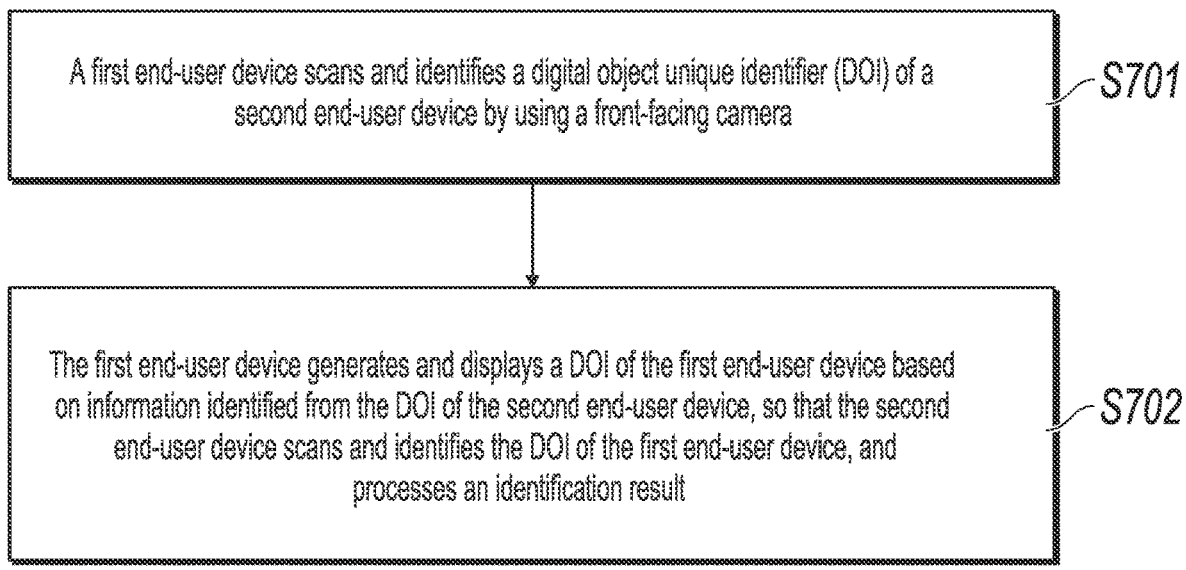
FIG. 7 is a schematic flowchart illustrating a fourth method for information exchange, according to an implementation of the present application.

In the previously described implementations, the identity information is used as one of main interaction information. In practice, any information that includes the identity information (for example, multimedia information or hyperlinks) can be interacted by using the solution of the present application. Based on this idea, an implementation of the present application further provides a schematic flowchart illustrating a fourth method for information exchange (from a perspective of a first end-user device), which is shown in FIG. 7. The procedure in FIG. 7 mainly corresponds to the first end-user device, and aims to highlight convenience of interaction performed by using a front-facing camera, but is not intended to limit specific content of interacted information.

The procedure in FIG. 7 can include the following steps.

S701. A first end-user device scans and identifies a digital object identifier (DOI) of a second end-user device by using a front-facing camera.

S702. The first end-user device generates and displays a DOI of the first end-user device based on information identified from the DOI of the second end-user device, so that the second end-user device scans and identifies the DOI of the first end-user device, and processes an identification result.

The second end-user device can scan and identify the DOI of the first end-user device by using a front-facing scanning device such as a front-facing camera.

According to the method in FIG. 7, proximity bidirectional communication in offline scenarios and online scenarios can be implemented without using special communications modules such as Bluetooth wireless communications module or NFC communications modules, which reduces costs. In addition, the front-facing camera is used for scanning, implementing a simple operation and relatively high convenience.

The method for information exchange provided in the implementations of the present application is described above. Further, an implementation of the present application provides an apparatus corresponding to the method for information exchange, which is shown in FIG. 8, FIG. 9, FIG. 10, or FIG. 11.

Figure 8:
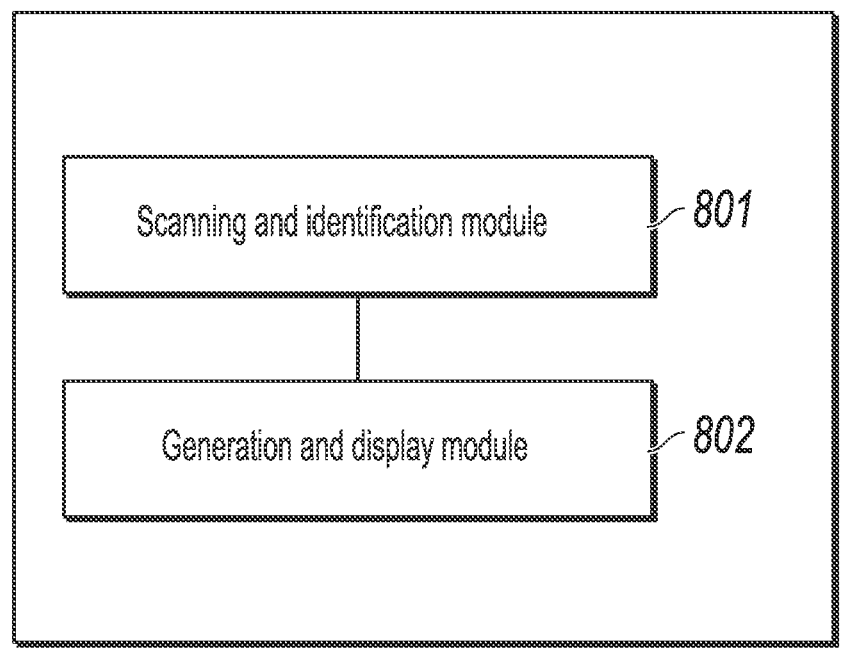
FIG. 8 is a schematic structural diagram of an apparatus for information exchange that corresponds to FIG. 1, according to an implementation of the present application.

FIG. 8 is a schematic structural diagram of an apparatus for information exchange that corresponds to FIG. 1, according to an implementation of the present application. The apparatus can be located on an execution body of the procedure in FIG. 1 (for example, a first end-user device), and includes the following: a scanning and identification module 801, configured to scan and identify a digital object identifier (DOI) of a second end-user device, where the DOI of the second end-user device includes identity information of the second end-user device; and a generation and display module 802, configured to generate and display a service DOI based on the identity information of the second end-user device that is identified by the scanning and identification module 801 from the DOI of the second end-user device, so that the second end-user device scans and identifies the service DOI, and performs service processing based on an identification result; where the service DOI includes the identity information of the second end-user device and specified service information.

Optionally, that a scanning and identification module 801 scans and identifies a DOI of a second end-user device specifically includes the following: the scanning and identification module 801 scans and identifies, by using the front-facing camera of the first end-user device, the DOI of the second end-user device that is displayed by the second end-user device.

Optionally, before generating and displaying the service DOI, the generation and display module 802 performs verification on the identity information of the second end-user device that is identified from the DOI of the second end-user device, and determines that the verification succeeds.

Optionally, the service DOI further includes identity information of the first end-user device, so that the second end-user device performs verification.

Optionally, the identity information includes device information and/or account information.

Optionally, the DOI includes a two-dimensional code and/or a barcode.

Figure 9:
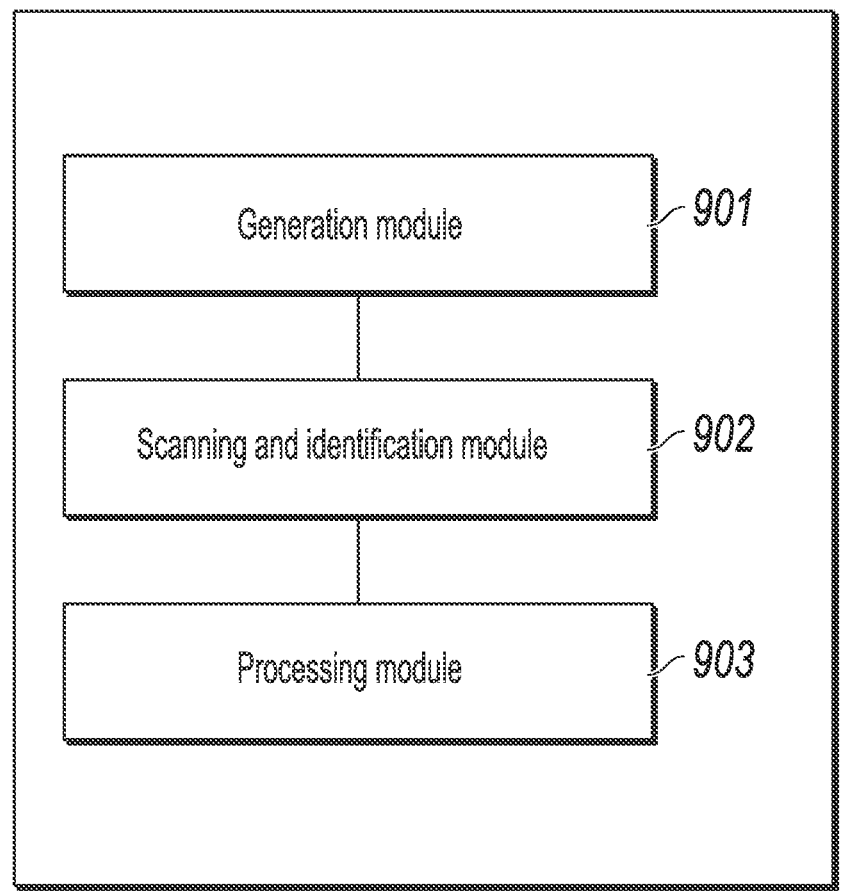
FIG. 9 is a schematic structural diagram of an apparatus for information exchange that corresponds to FIG. 3, according to an implementation of the present application.

FIG. 9 is a schematic structural diagram of an apparatus for information exchange that corresponds to FIG. 3, according to an implementation of the present application. The apparatus can be located on an execution body of the procedure in FIG. 3 (for example, a second end-user device), and includes the following: a generation module 901, configured to generate a digital object identifier (DOI) of the second end-user device, where the DOI of the second end-user device includes identity information of the second end-user device; a scanning and identification module 902, configured to scan and identify a service DOI displayed by a first end-user device, where the service DOI is generated by the first end-user device based on the identity information of the second end-user device, and the identity information of the second end-user device is obtained by the first end-user device by scanning and identifying the DOI of the second end-user device; and a processing module 903, configured to perform service processing based on an identification result of the service DOI; where the service DOI includes the identity information of the second end-user device and specified service information.

Optionally, the identity information of the second end-user device is obtained by the first end-user device by scanning and identifying the DOI of the second end-user device by using a front-facing camera of the first end-user device, where the DOI of the second end-user device is displayed by the second end-user device.

Optionally, that a scanning and identification module 902 scans and identifies a service DOI displayed by a first end-user device specifically includes the following: the scanning and identification module 902 scans and identifies, by using a front-facing camera of the second end-user device, the service DOI displayed by the first end-user device.

Optionally, the service DOI further includes identity information of the first end-user device, so that the second end-user device performs verification.

Optionally, that a processing module 903 performs service processing based on an identification result specifically includes the following: the processing module 903 sends the identity information of the second end-user device that is identified from the service DOI, and the specified service information to a server; and receives a service processing result returned by the server, where the service processing result is obtained by the server by performing service processing based on the specified service information after the identity information of the second end-user device is verified.

Optionally, the service information is payment information; and that a processing module 903 performs service processing based on an identification result specifically includes the following: the processing module 903 sends the identity information of the second end-user device that is identified from the service DOI, and the specified payment information to the server; and receives a payment result returned by the server, where the payment result is obtained by the server by performing electronic payment service processing based on the specified payment information after the identity information of the second end-user device is verified.

Optionally, the first end-user device corresponds to a payer of the electronic payment service, and the second end-user device corresponds to a payee of the electronic payment service.

Optionally, the identity information includes device information and/or account information.

Optionally, the DOI includes a two-dimensional code and/or a barcode.

Figure 10:
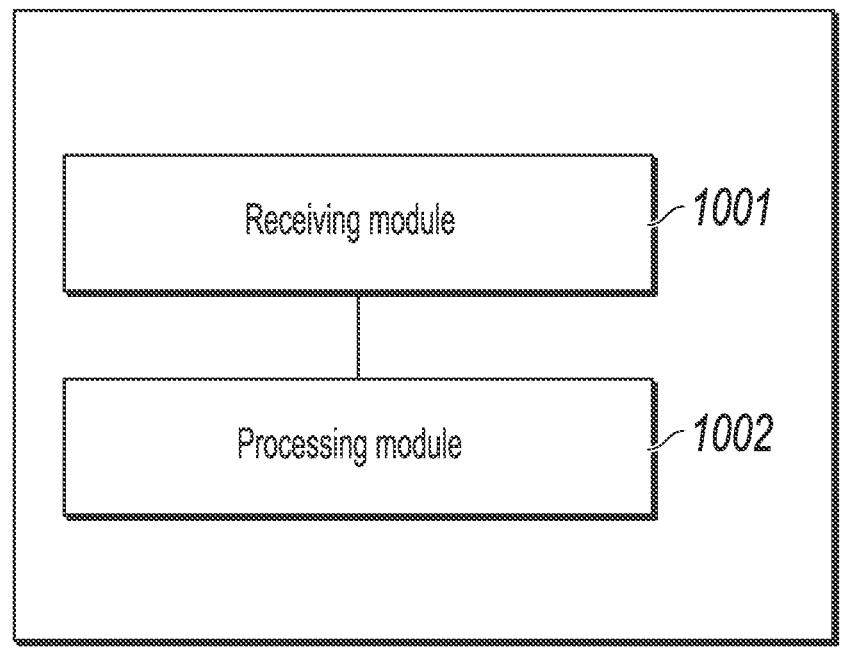
FIG. 10 is a schematic structural diagram of an apparatus for information exchange that corresponds to FIG. 5, according to an implementation of the present application.

FIG. 10 is a schematic structural diagram of an apparatus for information exchange that corresponds to FIG. 5, according to an implementation of the present application. The apparatus can be located on an execution body of the procedure in FIG. 5 (for example, a server), and includes the following: a receiving module 1001, configured to receive identity information of a second end-user device that is sent by the second end-user device and that is obtained by scanning and identifying a service digital object identifier (DOI), and specified service information; and a processing module 1002, configured to perform verification on the identity information of the second end-user device, and perform service processing based on the specified service information after the verification succeeds; where the service DOI is generated and displayed by a first end-user device based on the identity information of the second end-user device.

Optionally, the identity information of the second end-user device based on which the first end-user device generates and displays the service DOI is obtained by using the following method: the first end-user device scans and identifies, by using a front-facing camera of the first end-user device, a DOI of the second end-user device that is displayed by the second end-user device, to obtain the identity information of the second end-user device that is included in the DOI of the second end-user device.

Optionally, the service information is payment information; and that a processing module 1002 performs service processing based on the specified service information specifically includes the following: the processing module 1002 performs electronic payment service processing based on the specified payment information.

Optionally, the first end-user device corresponds to a payer of the electronic payment service, and the second end-user device corresponds to a payee of the electronic payment service.

Optionally, the identity information includes device information and/or account information.

Figure 11:
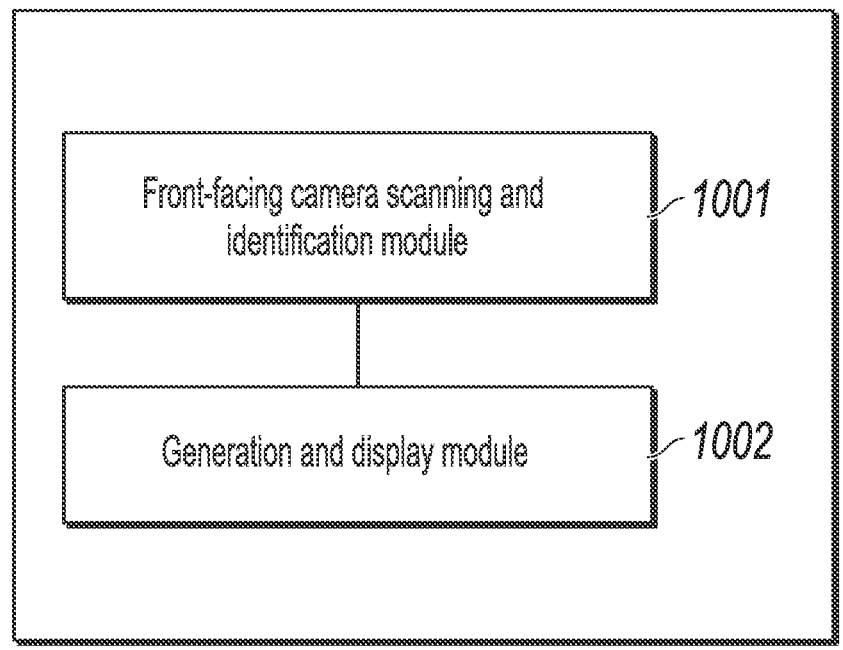
FIG. 11 is a schematic structural diagram of an apparatus for information exchange that corresponds to FIG. 7, according to an implementation of the present application.

FIG. 11 is a schematic structural diagram of an apparatus for information exchange that corresponds to FIG. 7, according to an implementation of the present application. The apparatus can be located on an execution body of the procedure in FIG. 7 (for example, a first end-user device), and includes the following: a front-facing camera scanning and identification module 1101, configured to scan and identify a digital object identifier (DOI) of a second end-user device by using a front-facing camera of the first end-user device; and a generation and display module 1102, configured to generate and display a DOI of the first end-user device based on information identified by the front-facing camera scanning and identification module 1101 from the DOI of the second end-user device, so that the second end-user device scans and identifies the DOI of the first end-user device, and processes an identification result.

The apparatus, the systems, and the methods provided in the implementations of the present application are in a one-to-one correspondence. Therefore, the apparatus and the system also have beneficial technical effects similar to those of the method. Because the beneficial technical effects of the method have been described in detail, the beneficial technical effects of the corresponding apparatus and system are omitted here.

In the 1990s, improvement of a technology can be clearly distinguished between hardware improvement (for example, improvement on a circuit structure such as a diode, a transistor, or a switch) and software improvement (improvement on a method procedure). However, with the development of technologies, improvement of many method procedures can be considered as direct improvement of a hardware circuit structure. Designers almost all program an improved method procedure to a hardware circuit, to obtain a corresponding hardware circuit structure. Therefore, it cannot be said that improvement of a method procedure cannot be implemented by using a hardware entity module. For example, a programmable logic device (PLD) (for example, a field programmable gate array (FPGA)) is such an integrated circuit. A logical function of the programmable logic device is determined by component programming executed by a user. The designers perform voluntary programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as an Advanced Boolean Expression Language (ABEL), an Altera Hardware Description Language (AHDL), Confluence, a Cornell University Programming Language (CUPL), an HDCal, a Java Hardware Description Language (JHDL), a Lava, a Lola, a MyHDL, a PALASM, and an Ruby Hardware Description Language (RHDL), etc. Currently, a VHDL Very-High-Speed Integrated Circuit Hardware Description Language (VHDL) and Verilog are most commonly used. A person skilled in the art should also understand that a method procedure only needs to be logically programmed, and programmed to the integrated circuit by using the previous hardware description languages so that a hardware circuit that implements the logical method procedure can be easily obtained.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented by using pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in the hardware component.

The system, apparatus, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. Certainly, when the present application is implemented, the functions of the units can be implemented in one or more pieces of software and/or hardware.

For example, the technical carrier used in the payment in the implementations of the present application can include near field communication (NFC), WiFi, 3G/4G/5G, a POS card swiping technology, a two-dimensional code scanning technology, a barcode scanning technology, Bluetooth, infrared, a short message service (SMS), a multimedia message service (MMS), etc.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, generating computer-implemented processing. Therefore, the instructions executed on the computer or the another programmable device provide steps for implementing a specific function in one or more processes in the flowcharts or in one or more blocks in the block diagrams.

In a typical configuration, the computing device includes one or more processors (CPU), one or more input/output interfaces, one or more network interfaces, and one or more memories.

The memory can include a non-persistent memory, a random access memory (RAM) and/or a nonvolatile memory in a computer readable medium, for example, a read-only memory (ROM) or a flash memory (flash RAM).

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission media that can be used to store information that can be accessed by the computing device. Based on the definition in the present specification, the computer readable medium does not include transitory computer readable medium (transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, and an optical memory) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are all described in a progressive way. For the same or similar parts of the implementations, refer to the implementations. Each implementation focuses on a difference from other implementations. Particularly, a system implementation is basically similar to a method implementation, and therefore is described briefly. For related parts, refer to partial descriptions of the method implementation.

The previous descriptions are merely implementations of the present application, and are not intended to limit the present application. A person skilled in the art can make various modifications and changes to the present application. Any modification, equivalent replacement, improvement, etc. made within the spirit and principle of the present application shall fall within the scope of the claims of the present application.

Figure 12:
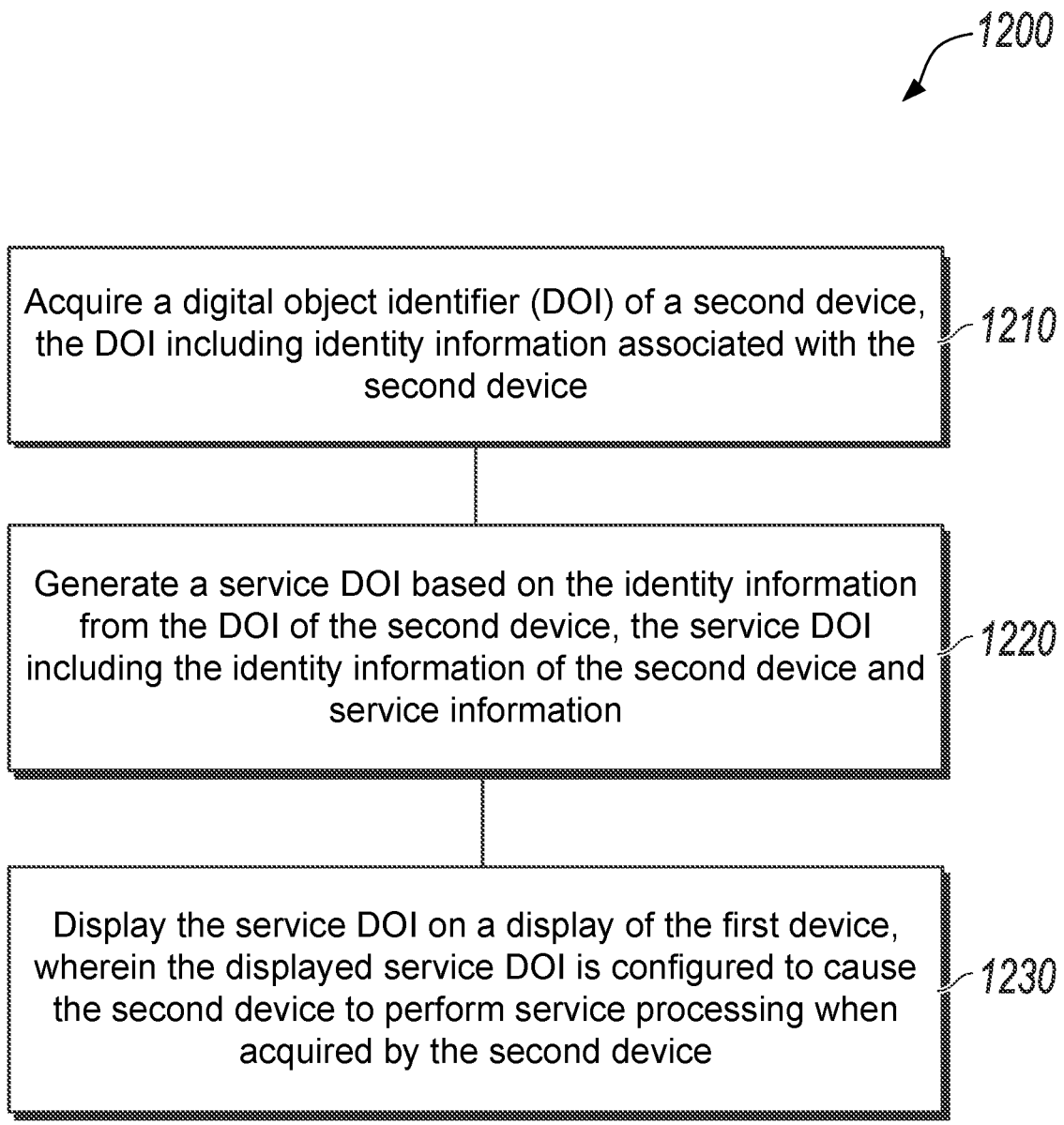
FIG. 12 is a flowchart illustrating an example of a computer-implemented method for information exchange, according to an implementation of the present disclosure.

FIG. 12 is a flowchart illustrating an example of a computer-implemented method 1200 for information exchange between devices, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1210, a first device acquires a digital object identifier (DOI) of a second device, the DOI including identity information associated with the second device. In some cases, acquiring, by the first device, the DOI of the second device comprises: scanning, by the first device by using a front-facing camera of the first device, the DOI of the second device that is displayed by the second device. In some cases, the DOI comprises at least one of a barcode or a Quick Response (QR) code.

At 1220, the first device generates a service DOI based on the identity information from the DOI of the second device, the service DOI including the identity information of the second device and service information. In some cases, the identity information includes at least one of device information or account information. In some cases, the service information is payment information associated with a payment transaction involving the first device and the second device.

At 1230, the first device displays the service DOI on a display of the first device, wherein the displayed service DOI is configured to cause the second device to perform service processing when the displayed service DOI is acquired by the second device, and wherein the service processing is based at least in part on the identity information and the service information included in the service DOI. In some cases, the service DOI includes identity information of the first device configured to enable verification of the first device by the second device. In some cases, performing the service processing includes sending a request to a server to perform the service processing, wherein the request includes the identity information and the service information. In some cases, in response to acquiring the DOI, the first device verifies the identity information of the second device included in the DOI.

The techniques described in this specification produce one or more technical effects. For example, by encoding service information and identity into a displayed DOI, a device can efficiently share this information with devices having common features. For example, mobile phone devices generally include one or more camera components for acquiring images, which can be used by a mobile device to acquire an image of a DOI (e.g., a Quick Response (QR) code) displayed by another device. The techniques thus allow information to be shared between the devices without requiring additional hardware components, such as wireless or optical transceivers, that may not be present in a large number of devices. Thus, the techniques allow a device to share data with a larger number of compatible devices, thereby increasing the utility of the device. Further, the techniques can reduce the manufacturing and retail cost of the device by alleviating any need for additional components (e.g., wireless or optical transceivers) that may not be standard on devices of that type.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for information exchange between devices comprising:

acquiring, by a first device associated with a payer in an electronic payment, a first Digital Object Identifier (DOI), the first DOI including identity information associated with a second device associated with a payee in the electronic payment, the identity information associated with the second device comprising device information;

in response to acquiring the first DOI, automatically extracting, by the first device, the identity information associated with the second device included in the first DOI;

verifying, by the first device based on the identity information associated with the second device, that the second device is authorized to request the electronic payment;

responsive to verifying that the second device is authorized to request the electronic payment, generating, by the first device, a second DOI based on the identity information associated with the second device associated with the payee extracted from the first DOI, the second DOI including the identity information associated with the second device associated with the payee, identity information associated with the first device configured to enable verification of the first device by the second device, and service information of the electronic payment; and displaying, by the first device, the second DOI on a display of the first device, wherein the displayed second DOI is configured to cause the second device associated with the payee to receive the electronic payment when the displayed second DOI is acquired by the second device and after verification of the identity information associated with the second device associated with the payee included in the second DOI, wherein verification of the identity information associated with the second device associated with the payee included in the second DOI comprises:

transmitting, by the second device to a server device, the second DOI;

determining, by the server device, whether the identity information associated with the second device included in the second DOI is consistent with identity information of the second device transmitting the second DOI to the server device;

in response to determining that the identity information associated with the second device included in the second DOI is consistent with the identity information of the second device transmitting the second DOI, determining, by the server device, that the second device transmitting the second DOI is a legal object operated by the payee and processing, by the server device, the electronic payment, thereby the second device associated with the payee receives the electronic payment; and in response to determining that the identity information associated with the second device included in the second DOI is not consistent with the identity information of the second device transmitting the second DOI, determining, by the server device, that the second device transmitting the second DOI is operated by an illegal user that illegitimately obtains the second DOI generated by the payer and pretends to be the payee and refusing, by the server device, processing the electronic payment.

2. The computer-implemented method of claim 1, wherein acquiring, by the first device, the first DOI comprises:

scanning, by the first device by using a front-facing camera of the first device, the first DOI that is displayed by the second device.

3. The computer-implemented method of claim 1, wherein the identity information associated with the first device includes account information.

4. The computer-implemented method of claim 1, wherein the first DOI comprises at least one of a barcode or a Quick Response (QR) code.

5. The computer-implemented method of claim 1, wherein the service information is payment information associated with a payment transaction involving the first device and the second device.

6. A non-transitory, computer-readable medium storing one or more instructions executable by a computer system to perform operations comprising:

acquiring, by a first device associated with a payer in an electronic payment, a first Digital Object Identifier (DOI), the first DOI including identity information associated with a second device associated with a payee in the electronic payment, the identity information associated with the second device comprising device information;

in response to acquiring the first DOI, automatically extracting, by the first device, the identity information associated with the second device included in the first DOI;

verifying, by the first device based on the identity information associated with the second device, that the second device is authorized to request the electronic payment;

responsive to verifying that the second device is authorized to request the electronic payment, generating, by the first device, a second DOI based on the identity information associated with the second device associated with the payee extracted from the first DOI, the second DOI including the identity information associated with the second device associated with the payee, identity information associated with the first device configured to enable verification of the first device by the second device, and service information of the electronic payment; and displaying, by the first device, the second DOI on a display of the first device, wherein the displayed second DOI is configured to cause the second device associated with the payee to receive the electronic payment when the displayed second DOI is acquired by the second device and after verification of the identity information associated with the second device associated with the payee included in the second DOI, wherein verification of the identity information associated with the second device associated with the payee included in the second DOI comprises:

transmitting, by the second device to a server device, the second DOI;

determining, by the server device, whether the identity information associated with the second device included in the second DOI is consistent with identity information of the second device transmitting the second DOI to the server device;

in response to determining that the identity information associated with the second device included in the second DOI is consistent with the identity information of the second device transmitting the second DOI, determining, by the server device, that the second device transmitting the second DOI is a legal object operated by the payee and processing, by the server device, the electronic payment, thereby the second device associated with the payee receives the electronic payment; and in response to determining that the identity information associated with the second device included in the second DOI is not consistent with the identity information of the second device transmitting the second DOI, determining, by the server device, that the second device transmitting the second DOI is operated by an illegal user that illegitimately obtains the second DOI generated by the payer and pretends to be the payee and refusing, by the server device, processing the electronic payment.

7. The non-transitory, computer-readable medium of claim 6, wherein acquiring, by the first device, the first DOI comprises:

scanning, by the first device by using a front-facing camera of the first device, the first DOI that is displayed by the second device.

8. The non-transitory, computer-readable medium of claim 6, wherein the identity information associated with the first device includes account information.

9. The non-transitory, computer-readable medium of claim 6, wherein the first DOI comprises at least one of a barcode or a Quick Response (QR) code.

10. The non-transitory, computer-readable medium of claim 6, wherein the service information is payment information associated with a payment transaction involving the first device and the second device.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

acquiring, by a first device associated with a payer in an electronic payment, a first Digital Object Identifier (DOI), the first DOI including identity information associated with a second device associated with a payee in the electronic payment, the identity information associated with the second device comprising device information;

in response to acquiring the first DOI, automatically extracting, by the first device, the identity information associated with the second device included in the first DOI;

verifying, by the first device based on the identity information associated with the second device, that the second device is authorized to request the electronic payment;

responsive to verifying that the second device is authorized to request the electronic payment, generating, by the first device, a second DOI based on the identity information associated with the second device associated with the payee extracted from the first DOI, the second DOI including the identity information associated with the second device associated with the payee, identity information associated with the first device configured to enable verification of the first device by the second device, and service information of the electronic payment; and displaying, by the first device, the second DOI on a display of the first device, wherein the displayed second DOI is configured to cause the second device associated with the payee to receive the electronic payment when the displayed second DOI is acquired by the second device and after verification of the identity information associated with the second device associated with the payee included in the second DOI, wherein verification of the identity information associated with the second device associated with the payee included in the second DOI comprises:

transmitting, by the second device to a server device, the second DOI;

determining, by the server device, whether the identity information associated with the second device included in the second DOI is consistent with identity information of the second device transmitting the second DOI to the server device;

in response to determining that the identity information associated with the second device included in the second DOI is consistent with the identity information of the second device transmitting the second DOI, determining, by the server device, that the second device transmitting the second DOI is a legal object operated by the payee and processing, by the server device, the electronic payment, thereby the second device associated with the payee receives the electronic payment; and in response to determining that the identity information associated with the second device included in the second DOI is not consistent with the identity information of the second device transmitting the second DOI, determining, by the server device, that the second device transmitting the second DOI is operated by an illegal user that illegitimately obtains the second DOI generated by the payer and pretends to be the payee and refusing, by the server device, processing the electronic payment.

12. The computer-implemented system of claim 11, wherein acquiring, by the first device, the first DOI comprises:

scanning, by the first device by using a front-facing camera of the first device, the first DOI that is displayed by the second device.

13. The computer-implemented system of claim 11, wherein the identity information associated with the first device includes account information.

14. The computer-implemented system of claim 11, wherein the first DOI comprises at least one of a barcode or a Quick Response (QR) code.

15. The computer-implemented system of claim 11, wherein the service information is payment information associated with a payment transaction involving the first device and the second device.

* * * * *